(12) United States Patent
Mataigne

(10) Patent No.: US 9,816,168 B2
(45) Date of Patent: *Nov. 14, 2017

(54) METHOD FOR PRODUCING A SHEET HAVING A ZNALMG COATING WITH OPTIMIZED WIPING

(71) Applicant: ArcelorMittal, Luxembourg (LU)

(72) Inventor: Jean-Michel Mataigne, Senlis (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,910

(22) Filed: Aug. 5, 2016

(65) Prior Publication Data

US 2016/0340767 A1    Nov. 24, 2016

Related U.S. Application Data

(63) Continuation-in-part of application No. 15/106,367, filed as application No. PCT/IB2013/061222 on Jun. 20, 2013.

(51) Int. Cl.
*C23C 2/16* (2006.01)
*C23C 2/06* (2006.01)
(Continued)

(52) U.S. Cl.
CPC .............. *C23C 2/16* (2013.01); *B32B 15/013* (2013.01); *C22C 18/04* (2013.01); *C23C 2/00* (2013.01); *C23C 2/02* (2013.01); *C23C 2/04* (2013.01); *C23C 2/06* (2013.01); *C23C 2/12* (2013.01); *C23C 2/14* (2013.01); *C23C 2/18* (2013.01);
(Continued)

(58) Field of Classification Search
CPC .... C23C 2/06; C23C 2/16; C23C 2/00; C23C 2/02; C23C 2/04; C23C 2/12; C23C 2/14; C23C 2/18; C23C 2/20; C23C 2/26; C23C 2/40; C22C 18/04; C22C 18/00; B32B 15/013; B32B 15/043; B32B 15/18

See application file for complete search history.

(56) References Cited

U.S. PATENT DOCUMENTS

2011/0111255 A1    5/2011    Diez et al.

FOREIGN PATENT DOCUMENTS

EP    2119804 A1    11/2009
EP    2634283 A1    9/2013
(Continued)

*Primary Examiner* — Michael E La Villa
(74) *Attorney, Agent, or Firm* — Davidson, Davidson & Kappel, LLC; Jennifer L. O'Connell; William C. Gehris

(57) ABSTRACT

The present invention provides a method for producing a sheet. The method includes providing a substrate, depositing a metal coating over at least one surface by dipping the substrate in a bath in order to obtain the sheet, wiping the metal coating by means of at least one nozzle projecting through at least one outlet a wiping gas onto the metal coating, the sheet being run in front of the nozzle, the wiping gas being ejected from the nozzle along a primary direction of ejection (E), a confinement box delimiting a confined zone at least downstream of the zone of impact (I) of the wiping gas on the sheet and solidifying the metal coating. The method satisfying:

$$\frac{Z}{d} \leq 12 \text{ and } f_{O_2} \leq \frac{10^{-4}}{W^2}\left(0.63 + \sqrt{0.4 + 94900^*W^2}\right) \text{ with } W = \frac{\sqrt{PdZ}}{V}.$$

11 Claims, 2 Drawing Sheets

(51) Int. Cl.
  *B32B 15/01* (2006.01)
  *C22C 18/04* (2006.01)
  *C23C 2/04* (2006.01)
  *C23C 2/00* (2006.01)
  *C23C 2/12* (2006.01)
  *C23C 2/14* (2006.01)
  *C23C 2/02* (2006.01)
  *C23C 2/18* (2006.01)
  *C23C 2/40* (2006.01)
  *C23C 2/26* (2006.01)
  *G05D 5/00* (2006.01)
  *C23C 2/20* (2006.01)
  *G05D 5/02* (2006.01)

(52) U.S. Cl.
  CPC ............ *C23C 2/20* (2013.01); *C23C 2/26* (2013.01); *C23C 2/40* (2013.01); *G05D 5/00* (2013.01); *G05D 5/02* (2013.01)

(56) References Cited

FOREIGN PATENT DOCUMENTS

| | | |
|---|---|---|
| EP | 2634284 A1 | 9/2013 |
| WO | 2010130883 A1 | 11/2010 |
| WO | 2012091385 A2 | 7/2012 |
| WO | WO 2012/091385 * | 7/2012 |

\* cited by examiner

METHOD FOR PRODUCING A SHEET HAVING A ZNALMG COATING WITH OPTIMIZED WIPING

This is a continuation of U.S. application Ser. No. 15/106,367 filed on Jun. 20, 2016 which is a national stage of PCT/IB2013/061222 filed on Dec. 20, 2013, the entire disclosures of which are hereby incorporated by reference herein.

The present invention relates to a method for producing a sheet comprising a substrate made of steel whereof at least one surface is coated with a metal coating comprising of Al and Mg, with the remainder of the metal coating consisting of Zn.

BACKGROUND

Such a sheet is particularly intended for the manufacture of car body parts for a land motor vehicle such as an automobile.

The sheet is then cut and deformed in order to produce component parts that are assembled to form the bodywork parts or body shell.

This body shell is then coated with a film of paint (or paint system), which provides a good surface appearance and participates, along with the zinc based metal coating, in ensuring protection against corrosion.

Some of these sheets may have defects that are visible to the naked eye prior to being subjected to painting.

These defects consist of alternating dull and bright zones on the exterior surface of the metal coatings. These zones are alternated along the longitudinal direction of the sheet, that is to say the one corresponding to the direction of movement of the sheets during their production process.

The dull zones generally have a length that is twice as long as that of the bright zones.

BRIEF SUMMARY

Even if the requirements of auto manufacturers have been satisfied after the painting process, these defects visible to the naked eye have a negative impact on the perception that auto manufacturers have with respect to the quality of sheets.

Moreover, these defects are even more problematic for applications where the sheets are not subjected to painting.

An object of the present invention is therefore to provide a production method for producing a sheet, comprising a substrate whereof at least one surface has been coated with or dipped in a zinc based metal coating material comprising between 0.5% and 8% by weight of Al and 0.5% to 3.3% by weight of Mg, with the exterior surface of the metal coating having an improved aesthetic appearance.

The present invention provides a method for producing a sheet comprising a substrate made of steel whereof at least one surface is coated with a metal coating comprising of Al and Mg, with the remainder of the metal coating consisting of Zn, inevitable impurities and possibly one or more additional elements selected from among Si, Sb, Pb, Ti, Ca, Mn, Sn, La, Ce, Cr, Zr or Bi, the content by weight of each additional element in the metal coating being less than 0.3%, the metal coating having a content by weight of Al comprised between 0.5% and 8% and a content by weight of Mg comprised between 0.3% and 3.3%, the method including at least the steps of:
provision of the substrate;
depositing of a metal coating over at least one surface by dipping the substrate in a bath in order to obtain the sheet;
wiping of the metal coating by means of at least one nozzle projecting through at least one outlet a wiping gas onto the metal coating, the sheet being run in front of the nozzle, the wiping gas being ejected from the nozzle along a primary direction of ejection (E), a confinement box delimiting a confined zone at least downstream of the zone of impact (I) of the wiping gas on the sheet;
solidification of the metal coating,
a method in which $$\frac{Z}{d} \leq 12 \text{ and } f_{O_2} \leq \frac{10^{-4}}{W^2}\left(0.63 + \sqrt{0.4 + 94900 \cdot W^2}\right) \text{ (A)}$$

$$\text{with } W = \frac{\sqrt{PdZ}}{V},$$

with Z being the distance between the sheet and the nozzle along the primary direction of ejection (E), Z being expressed in m, $f_{O_2}$ being the volume fraction of oxygen in the confined zone, with d being the average height of the outlet of the nozzle along the direction (S) of movement of the sheet running in front of the nozzle, d being expressed in m, with V being the speed of movement of the sheet running in front of the nozzle, V being expressed in $ms^{-1}$, and P being the excess pressure of the wiping gas in the nozzle as compared to the atmospheric pressure, P being expressed in $Nm^{-2}$.

The method may also include the following characteristic features, taken into consideration individually or in combination:

the method may include, prior to the coating deposition step, a step of cold rolling of the sheet;
the method may include, after the step of coating solidification, a step of skin-pass rolling of the sheet;
the content by weight of Al in the metal coating may be comprised between 0.5% and 3.9%;
the content by weight of Al in the metal coating may be comprised between 1.5% and 3.9%;
the content by weight of Al in the metal coating may be comprised between 4.4% and 5.6%;
the content by weight of Mg in the metal coating may be comprised between 1.0% and 3.3%;
the content by weight of Mg in the metal coating may be comprised between 2.5% and 3.3%; and
the content by weight of Mg in the metal coating may be comprised between 0.3% and 1.5%.

The present invention further provides a sheet obtainable according to the method recited above, the sheet comprising a substrate made of steel whereof at least one surface is coated with a metal coating comprising of Al and Mg, with the remainder of the metal coating consisting of Zn, inevitable impurities and possibly one or more additional elements selected from among Si, Sb, Pb, Ti, Ca, Mn, Sn, La, Ce, Cr, Zr or Bi, the content by weight of each additional element in the metal coating being less than 0.3%, the metal coating having a content by weight of Al comprised between 0.5% and 8% and a content by weight of Mg comprised between 0.3% and 3.3%.

The sheet may also include the following characteristic features, taken into consideration individually or in combination:

the content by weight of Al in the metal coating may be comprised between 0.5% and 3.9%;

the content by weight of Al in the metal coating may be comprised between 1.5% and 3.9%;

the content by weight of Al in the metal coating may be comprised between 4.4% and 5.6%;

the content by weight of Mg in the metal coating may be comprised between 1.0% and 3.3%;

content by weight of Mg in the metal coating may be comprised between 2.5% and 3.3%; and the content by weight of Mg in the metal coating may be comprised between 0.3% and 1.5%.

BRIEF DESCRIPTION OF THE DRAWINGS

The invention will be illustrated by indicative examples provided purely for information and without limitation, with reference made to the accompanying figures in which.

DETAILED DESCRIPTION

Figure 1:
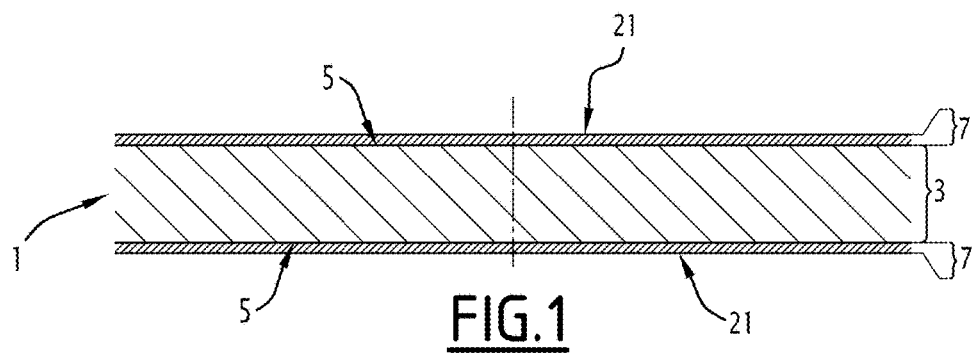
FIG. 1 is a schematic cross sectional view illustrating the structure of a sheet according to the invention.

The sheet 1 shown in FIG. 1 comprises a substrate 3 made of steel coated on each of its two surfaces 5 with a metal coating 7.

It will be noted that the relative thicknesses of the substrate 3 and the different layers covering it have not been adhered to in FIG. 1 in order to facilitate the representation thereof.

The coatings 7 present on the two surfaces 5 are analogous and only one will be described in detail subsequently. By way of a variant (not shown), only one of the surfaces 5 has a coating 7.

The coating 7 generally has a thickness that is less than or equal to 25 μm and is aimed at protecting the substrate 3 against corrosion.

The coating 7 includes zinc, aluminum and magnesium.

The content by weight of aluminum in the metal coating 7 is comprised between 0.5% and 8%, preferably between 4.4% and 5.6%, more preferably between 0.5% and 4.5%, more preferably between 0.5% and 3.9%, more preferably between 1.0% and 3.9%, more preferably between 1.5% and 3.9%, and even more preferably between 2% and 3.9%. The content by weight of magnesium in the metal coating 7 is comprised between 0.3% and 3.3%, preferably between 0.3% and 1.5%, more preferably between 0.3% and 0.7%, more preferably between 0.5% and 3.3%, more preferably between 1.0% and 3.3%, more preferably between 1.5% and 3.3%, more preferably between 2% and 3.3%, and even more preferably between 2.5% and 3.3%.

These weight content levels correspond to those of the bath used in order to produce the coating 7 and which will be described subsequently.

These weight content levels are those that can be measured on the surface and in the mass of the metal coating 7, for example by glow discharge spectrometry. These content levels do not take into account the composition of the interface between the coating 7 and the substrate 3, wherein the intermetallic formation leads to a local increase in the aluminum content.

Thus, for measuring the weight content levels claimed according to this present document, it is stipulated to not use a chemical dissolution technique that would lead to the simultaneous dissolution of the metal coating 7 and these intermetallic formations and thus result in an overestimation of the content by weight of aluminum of the order of 0.05% to 0.5% depending on the thickness of the metal coating 7.

In order to produce the sheet 1, a suitable way to proceed may for example be as follows here below.

Use is made of a substrate 3 in the form of a strip for example obtained by means of hot rolling followed by cold rolling.

Preferably, for the cold rolling, the substrate 3 is first cold-rolled with a reduction ratio generally comprised between 60% and 85%, in a manner so as to obtain a substrate 3 of, having a thick for example between 0.2 and 2 mm.

The cold rolled substrate 3 may then be subjected to an annealing process carried out in a conventional manner in an annealing furnace under a reducing atmosphere, with a view to recrystallizing it after the cold working and hardening that it has undergone during the cold rolling operation.

The recrystallization annealing also serves to activate the surfaces 5 of the substrate 3 so as to favour the chemical reactions necessary for the subsequent operation of dipping.

Depending upon the grade of steel, the recrystallization annealing is carried out at a temperature comprised between 650° C. and 900° C., for a period of time required for the recrystallization of the steel and the activation of the surfaces 5.

The substrate 3 is subsequently cooled to a temperature close to that of a bath 13 contained in a tank 15.

The composition of the bath 13 is zinc based and contains:

between 0.5% and 8% by weight of aluminum, preferably between 4.4% and 5.6%, more preferably between 0.5% and 4.5%, more preferably between 0 5% and 3.9%, more preferably between 1.0% and 3.9%, more preferably between 1.5% and 3.9%, and even more preferably between 2% and 3.9%, between 0.3% and 3.3% by weight of magnesium, preferably between 0.3% and 1.5%, more preferably between 0.3% and 0.7%, more preferably between 0.5% and 3.3%, more preferably between 1% and 3.3%, more preferably between 1.5% and 3.3%, more preferably between 2% and 3.3%, and even more preferably between 2.5% and 3.3%.

In a general manner, each aluminum content range as indicated here above may be used in combination with each of the magnesium content ranges in order to form a bath 13.

When the content by weight of aluminum is between 4.4% and 5.6%, the content by weight of magnesium is preferably between 0.3% and 1.5%.

When the content by weight of aluminum is between 1.5% and 3.9%, the content by weight of magnesium is preferably between 1.0% and 3.3%.

The composition for the bath 13 may also contain up to 0.3% by weight of optional additive elements such Si, Sb, Pb, Ti, Ca, Mn, Sn, La, Ce, Cr, Ni, Zr or Bi.

These different elements may, among other things, serve to enable improving the corrosion resistance of the coating or indeed provide for enhancements in terms of its fragility or adhesiveness, for example.

The person skilled in the art who knows their effects on the characteristics of the coating would know about using them in accordance with the desired additional objective. It has also been verified that these elements do not interfere with the control of the settle wave obtained by the method according to the invention.

Finally, the bath 13 may contain inevitable impurities derived from the feed ingots of the tank or even from the through passage of the substrate 3 in the bath 13. In this context mention may be made in particular of iron.

After passing through the bath 13, the substrate 3 is coated on both of its surfaces 5 by the coating 7 so as to obtain the sheet 1.

Figure 2:
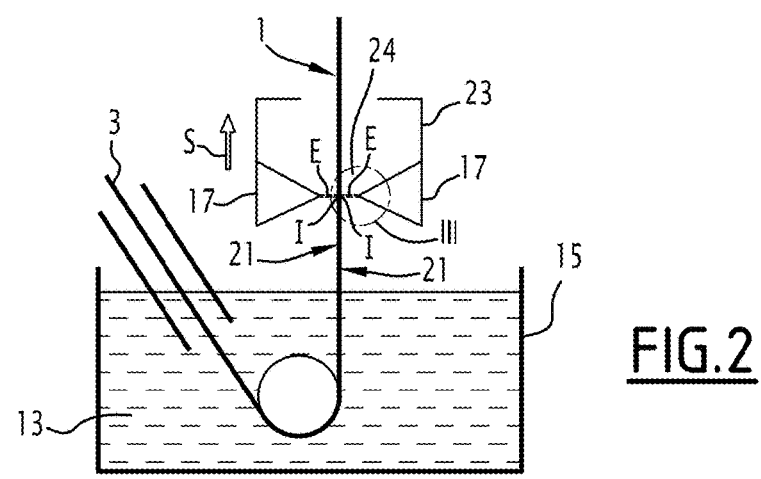
FIG. 2 is a schematic side view illustrating a tank and wiping nozzles used for producing the sheet shown in FIG. 1.

As illustrated in FIG. 2, the sheet 1 is subsequently subjected to a wiping process by means of nozzles 17 placed on both sides of the sheet 1 and which project a wiping gas, preferably an inert gas, towards the exterior surfaces 21 of the coatings 7. The wiping gas is ejected from each nozzle 17 along a primary direction of ejection E. The primary directions of ejection E of each nozzle 17 are materially illustrated in dashed lines in FIGS. 2 and 3.

In the example represented, the directions E are horizontal and orthogonal to the sheet 1. In other embodiments, the directions E may have other inclinations in relation to the sheet 1.

The speed V of movement of the substrate 3 running on the production line used and therefore in front of the nozzles 17 is generally between 80 m/min and 300 m/min, and is preferably greater than 120 m/min, or even greater than 150 m/min.

In order to limit the oxidation of the coatings 7, the method provides for a confinement box 23 in order to confine the atmosphere around the sheet 1 at least downstream of the zones of impact I of the wiping gas on the sheet 1. The term 'downstream' is understood to be used here in relation to the direction of movement S of the sheet 1 running in front of the nozzles 17.

The confinement box 23 may, by way of a variant, extend in the upstream direction up to the surface of the bath 13 or until an intermediate position between the nozzles 17 and the surface of the bath 13.

The confinement box 23 defines a confined zone 24 that encloses the zone of impact I of the wiping gas on the metal sheet 1 and extends from the zones at least in the downstream direction.

Figure 3:
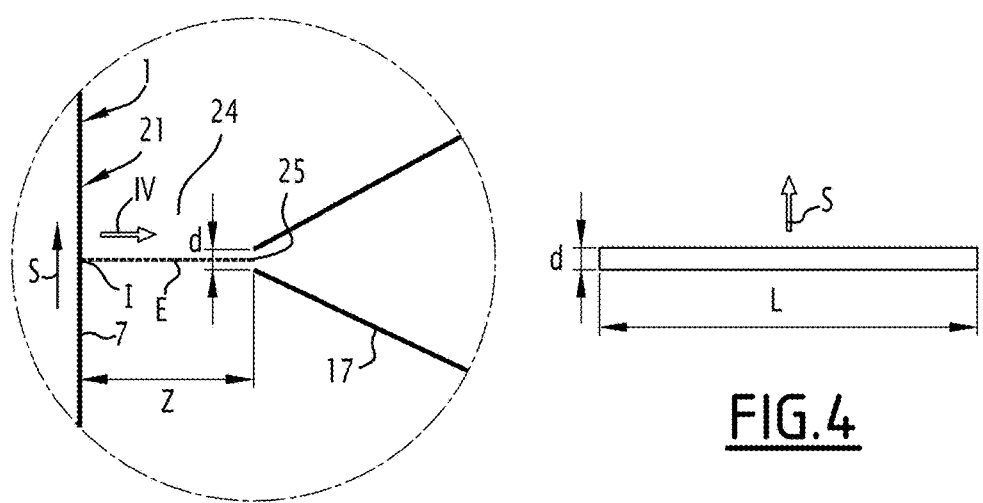
FIG. 3 is a partial, schematic and enlarged view of the encircled portion III of the FIG. 2.

In the example described here above, the nozzles 17 have structures and positioning specifications in relation to the sheet 1 that are analogous and they function with analogous settings. Thus, only the nozzle 17 on the right in FIG. 2 will be described here below with reference to FIG. 3. It will also be noted that only the nozzle 17 on the right is represented in FIG. 3.

By way of a variant, the nozzles 17 may have different structures, different positions and/or function with different settings. It is also possible to provide for a nozzle on only one side of the sheet 1.

The nozzle 17 has an outlet 25 through which the wiping gas is ejected towards the exterior surface 21 of the coating 7 placed so as to face it. Various different external forms may possibly be envisaged for the nozzle 17.

The outlet 25 of the nozzle 17 is disposed at a distance Z from the sheet 1 along the primary direction of ejection E.

Figure 4:
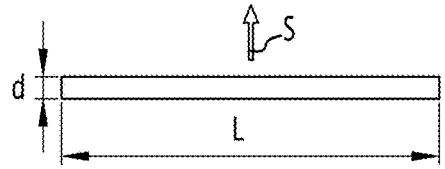
FIG. 4 is a schematic view taken along the arrow IV of FIG. 3, and illustrating the form shape of the outlet of the nozzle shown in FIG. 3.

When E is not orthogonal to the sheet 1, Z is thus not the smallest distance between the sheet 1 and the nozzle 17. As illustrated in FIG. 4, the outlet 25 is generally presented in the form of a slot which extends orthogonally to the direction L and to the plane of FIG. 3, over a width L that is at least equal to the width of the sheet 1.

Generally, the height of the outlet 25, that is to say its dimension parallel to the direction S of movement of the sheet 1 running in front of the nozzle 17, is constant as illustrated in FIG. 4. This being so, however, in some variant embodiments, this height may vary over the width of the outlet 25. Thus, the outlet 25 may for example have a slightly flared shape towards its ends (shape of a bowtie).

In order to take into account these possible variations in height and various different possible embodiments, consideration will subsequently be given to the average height d of the outlet 25 over its width L.

The excess pressure of the wiping gas in the nozzle 17 as compared to the atmospheric pressure is denoted as P and the volume fraction of oxygen in the confined zone 24 is denoted as $f_{O_2}$. In other words, P is the difference between the pressure of the wiping gas in the nozzle 17 and the atmospheric pressure.

According to the invention, $$\frac{Z}{d} \leq 12 \text{ and } f_{O_2} \leq \frac{10^{-4}}{W^2}\left(0.63 + \sqrt{0.4 + 94900 \cdot W^2}\right) \text{ (A)}$$

$$\text{with } W = \frac{\sqrt{PdZ}}{V},$$

wherein:

Z is expressed in m
d is expressed in m
V is expressed in $ms^{-1}$
P is expressed in $Nm^{-2}$ Generally, the parameter V is imposed by the grade of the substrate 3 and the heating capacity in the recrystallization annealing zone of the substrate 3. The height d is chosen for a production run. This leaves no more than Z, P and $f_{O_2}$ to be adjusted in order to satisfy the above cited requirements.

$f_{O_2}$ is measured, for example after sampling in the zone 24.

Typically, such a sampling will be carried out at a distance that is relatively close to a zone of impact I, for example less than or equal to 3Z, so as to be representative of the volume fraction of oxygen at the level of the zones of impact I.

It may also be necessary to extend the confinement box 23 or to modify it in order to improve the containment and satisfy the equation (A).

As will be detailed here below, compliance with the above conditions provides the ability to obtain, after solidification of the coatings 7 and prior to possibly being subjected to painting, an improved aesthetic appearance.

The coatings 7 are subsequently allowed to cool in a controlled manner in order for them to solidify.

When the coatings 7 have completely cooled, the sheet 1 may undergo a skin-pass rolling operation in order to impart to the exterior surfaces 21 of the coatings 7 a texture that facilitates the subsequent forming of the sheet 1.

In fact, the skin-pass operation serves the purpose of transferring to the exterior surfaces 21 of the coatings 7 of the sheet 1 a sufficient roughness that is needed to ensure that the forming get carried out in good conditions, by promoting good retention of the oil applied to the sheet 1 prior to the forming thereof. The rate of elongation of the sheet 1 during the skin-pass operation is generally between 0.5% and 2%.

The skin-pass operation is generally carried out for a sheet 1 intended for use in the manufacture of body work parts for motor vehicles.

When the sheet 1 is intended for use in the manufacture of household electrical appliances, for example, this additional operation is not required to be performed.

The sheet 1 whether or not processed by skin-pass can subsequently be cut and then formed, for example, by means of deep drawing, bending or profiling, in order to produce a part that can then be subjected to painting so as to form on each coating 7, a film of paint (or paint system).

In the case of parts for household electrical appliances, it is also possible to eventually subject the paint films to an annealing process by physical and/or chemical means, known per se.

For this purpose, the process may involve passing the painted part through a hot air oven or an induction oven, or even under Ultra Violet lamps or under a device diffusing electron beams.

For automotive applications, after phosphating, each component part is dipped in a cataphoresis bath, and followed by successive application of a coat of primer paint, a layer of base paint, and possibly a layer of top coating varnish.

Prior to applying the cataphoretic layer on the component part, it is degreased in advance and then phosphated in a manner such as to ensure the adhesion of the cataphoretic treatment.

The cataphoretic coat thus provides the component part with an extra layer of protection against corrosion. The layer of primer paint, usually applied with a spray gun, prepares the component part for its final appearance and protects it against chipping and from UV rays. The coat of base paint gives the component part its colour and its final appearance. The coat of varnish provides the surface of the component part with good mechanical resistance, resistance against aggressive chemical agents and a good surface appearance.

In general, the weight of the phosphate layer is comprised between 1.5 g/m² and 5 g/m².

The paint films that are used to protect the component parts and ensure they have an optimal surface appearance include, for example a cataphoretic coat having a thickness of 15 µm to 25 µm, a coat of primer paint having a thickness of 35 µm to 45 µm, and a coat of base paint having a thickness of 40 µm to 50 µm.

In the event where the paint films in addition comprise a coat of varnish, the thicknesses of the various different coats of paint are generally as follows:

coat of cataphoretic paint: between 15 µm and 25 µm, preferably less than 20 µm,
coat of primer paint: less than 45 µm,
coat of base paint: less than 20 µm, and
coat of varnish: less than 55 µm.

The paint films may also possibly not include any cataphoretic paint layer, and may include only one coat of primer paint and one coat of paint base and possibly one coat of varnish.

Preferably, the total thickness of the paint films will be less than 120 µm or even less than 100 µm.

The invention will now be illustrated by means of indicative tests provided for information and without limitation.

Table I here below details the conditions of a series of tests conducted with various different values of Z, d, V, P and $f_{O_2}$.

In these tests, the coatings 7 had content by weight levels for aluminum of about 3.7% and for magnesium of about 3.1%. Their thicknesses were about 10 µm. The temperature of the bath used to produce these coatings 7 was about 420° C. The wiping gas used was nitrogen based and the rate of cooling of the coatings 7 until solidification thereof was between 14° C./s and 15° C./s.

TABLE I

| Tests | Z (m) | d (m) | Z/d | V (m/s) | P in N/m2 | $f_{O_2}$ | Eq (A) | Defect |
|---|---|---|---|---|---|---|---|---|
| 1 | 0.012 | 0.001 | 12 | 0.617 | 12100 | 0.03 | YES | N |
|   | 0.012 | 0.001 | 12 | 0.617 | 12100 | 0.04 | YES | N |
|   | 0.012 | 0.001 | 12 | 0.617 | 12100 | 0.06 | NO | Y |
|   | 0.012 | 0.001 | 12 | 0.617 | 12100 | 0.07 | NO | Y |
| 2 | 0.01 | 0.001 | 10 | 1.000 | 15000 | 0.04 | YES | N |
|   | 0.01 | 0.001 | 10 | 1.000 | 15000 | 0.06 | YES | N |
|   | 0.01 | 0.001 | 10 | 1.000 | 15000 | 0.07 | YES | N |
|   | 0.01 | 0.001 | 10 | 1.000 | 15000 | 0.09 | NO | Y |
| 3 | 0.008 | 0.001 | 8 | 1.667 | 17500 | 0.10 | YES | N |
|   | 0.008 | 0.001 | 8 | 1.667 | 17500 | 0.12 | YES | N |
|   | 0.008 | 0.001 | 8 | 1.667 | 17500 | 0.13 | YES | N |
|   | 0.008 | 0.001 | 8 | 1.667 | 17500 | 0.15 | NO | Y |
| 4 | 0.005 | 0.001 | 5 | 2.500 | 12700 | 0.21 | YES | N |

The columns on the far right indicate for each test whether or not the parameters satisfy the equation (A) and specify if the defects previously mentioned above were present (letter Y) or if they were not observable (letter N).

Figure 5:
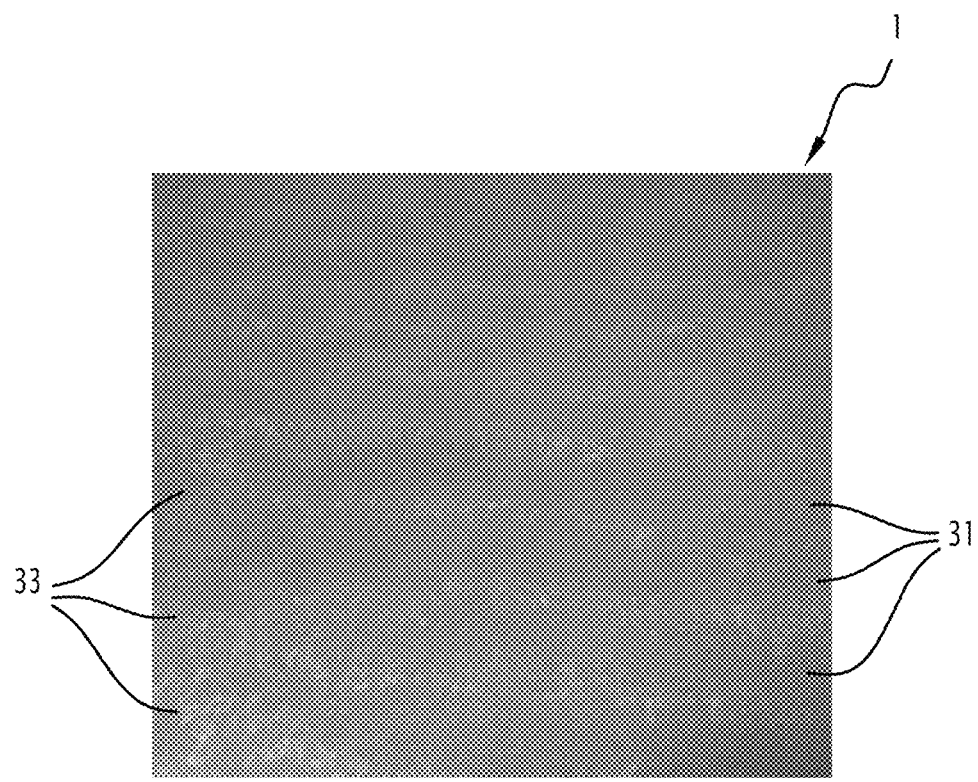
FIG. 5 is a photograph of a sheet having the defects previously mentioned above.

FIG. 5 illustrates a test where these defects were present.

It is then possible to visually observe on the exterior surface of the coatings 7 an alternating pattern of dull zones 31 and bright zones 33.

Satisfying the condition $$\frac{Z}{d} \leq 12,$$

and satisfying the equation (A) provides the ability, as shown in Table I above, to avoid the occurrence of these defects and thereby to improve the aesthetic appearance of sheet metal 1 coatings 7.

What is claimed is:

1. A method for producing a sheet comprising the steps of:
providing a substrate made of steel, the steel substrate including at least one surface coated with a metal coating comprising a content by weight of Al from 0.5% to 8% and a content by weight of Mg from 0.3% to 3.3%, a remainder of the metal coating comprising Zn and inevitable impurities;
depositing the metal coating over at least one surface by dipping the substrate in a bath in order to obtain the sheet;
wiping the metal coating with a wiping gas via at least one nozzle projecting through at least one outlet, with the sheet being run in front of the nozzle, the wiping gas being ejected from the nozzle along a primary direction of ejection (E), and a confinement box delimiting a confined zone at least downstream of a zone of impact (I) of the wiping gas on the sheet; and
solidifying the metal coating,
wherein $$\frac{Z}{d} \leq 12 \text{ and } f_{O_2} \leq \frac{10^{-4}}{W^2}\left(0.63 + \sqrt{0.4 + 94900 \cdot W^2}\right) \text{ (A)}$$

$$\text{with } W = \frac{\sqrt{PdZ}}{V},$$

Z being a distance between the sheet and the at least one nozzle along a primary direction of ejection (E), Z being expressed in m,
$f_{O_2}$ being a volume fraction of oxygen in the confined zone, d being an average height of the outlet of the at least one nozzle along a direction (S) of movement of the sheet running in front of the at least one nozzle, d being expressed in m, V being a speed of movement of the sheet running in front of the at least one nozzle, V being expressed in $ms^{-1}$, and P being an excess pressure of the wiping gas in the at least one nozzle as compared to an atmospheric pressure, P being expressed in $Nm^{-2}$.

2. The method according to claim 1, further comprising the step of:
   cold rolling the substrate prior to the step of depositing a coating.

3. The method according to claim 1, further comprising the step of:
   skin-pass rolling the sheet after the step of solidifying the coating.

4. The method according to claim 1, wherein the content by weight of Al in the metal coating is from 0.5% to 3.9%.

5. The method according to claim 4, wherein the content by weight of Al in the metal coating is from 1.5% to 3.9%.

6. The method according to claim 1, wherein the content by weight of Al in the metal coating is from 4.4% to 5.6%.

7. The method according to claim 1, wherein the content by weight of Mg in the metal coating is from 1.0% to 3.3%.

8. The method according to claim 7, wherein the content by weight of Mg in the metal coating is from 2.5% to 3.3%.

9. The method according to claim 1, wherein the content by weight of Mg in the metal coating is from 0.3% to 1.5%.

10. The method according to claim 1, wherein the metal coating consists of a content by weight of Al from 0.5% to 8% and a content by weight of Mg from 0.3% to 3.3%, and the remainder of the metal coating consists of Zn, inevitable impurities and at least one additional element selected from among Si, Sb, Pb, Ti, Ca, Mn, Sn, La, Ce, Cr, Zr or Bi, the content by weight of each additional element in the metal coating being less than 0.3%.

11. The method according to claim 1, wherein the metal coating consists of a content by weight of Al from 0.5% to 8% and a content by weight of Mg from 0.3% to 3.3%, and the remainder of the metal coating consists of Zn and inevitable impurities.

* * * * *